(12) United States Patent
Marchionda

(10) Patent No.: US 9,266,648 B2
(45) Date of Patent: Feb. 23, 2016

(54) INTEGRATED BAG CLOSURE

(71) Applicant: Tony Marchionda, Struthers, OH (US)

(72) Inventor: Tony Marchionda, Struthers, OH (US)

(*) Notice: Subject to any disclaimer, the term of this patent is extended or adjusted under 35 U.S.C. 154(b) by 0 days.

(21) Appl. No.: 14/456,278

(22) Filed: Aug. 11, 2014

(65) Prior Publication Data

US 2015/0117799 A1    Apr. 30, 2015

Related U.S. Application Data

(60) Provisional application No. 61/895,666, filed on Oct. 25, 2013.

(51) Int. Cl.
*B65D 33/16* (2006.01)

(52) U.S. Cl.
CPC ................................ *B65D 33/1625* (2013.01)

(58) Field of Classification Search
CPC  B65D 33/1625; Y10T 24/15; Y10T 24/3401; Y10T 24/155; Y10T 24/3924
USPC ......... 24/30.5 S, 30.5 R, 129 B, 130; 383/71, 383/70; D8/356
See application file for complete search history.

(56) References Cited

U.S. PATENT DOCUMENTS

| | | | | | |
|---|---|---|---|---|---|
| 83,240 | A | * | 10/1868 | Bates | F16G 11/10 24/129 R |
| 2,931,086 | A | * | 4/1960 | Rose | 24/545 |
| 2,981,990 | A | | 5/1961 | Balderree | |
| 3,264,698 | A | * | 8/1966 | Wright | B65D 33/1625 24/30.5 R |
| 3,897,163 | A | * | 7/1975 | Holmes | F16G 11/00 24/130 |
| 4,333,566 | A | * | 6/1982 | Holmes | 206/343 |
| 4,355,444 | A | * | 10/1982 | Haney | F16G 11/00 24/129 B |
| 4,361,935 | A | * | 12/1982 | Paxton | 24/30.5 R |
| 4,414,716 | A | * | 11/1983 | Stastney | 24/3.12 |
| 4,509,231 | A | | 4/1985 | Paxton | |
| 4,571,779 | A | * | 2/1986 | Koerschner et al. | 24/30.5 S |
| 4,617,775 | A | * | 10/1986 | Padrun | 52/684 |
| 4,651,507 | A | * | 3/1987 | Koerschner et al. | 53/461 |
| 4,760,624 | A | | 8/1988 | Fish | |
| 4,896,366 | A | | 1/1990 | Oxman | |
| 5,286,110 | A | * | 2/1994 | Benson et al. | 383/5 |
| 5,469,607 | A | * | 11/1995 | Henningsson et al. | 24/716 |
| 5,495,645 | A | * | 3/1996 | Suzuki et al. | 24/30.5 S |
| D372,420 | S | * | 8/1996 | Mendez | D8/383 |
| 5,617,656 | A | * | 4/1997 | Ludlow et al. | 40/673 |
| 5,625,925 | A | * | 5/1997 | Richards | B60P 7/0823 24/129 B |
| 5,852,851 | A | * | 12/1998 | Cooper | 24/30.5 R |
| 6,189,187 | B1 | * | 2/2001 | Williams | 24/563 |
| 7,004,441 | B1 | * | 2/2006 | Rutland | 248/690 |
| 7,249,991 | B1 | * | 7/2007 | Watson | 446/220 |
| 8,113,481 | B1 | | 2/2012 | Krysak | |
| 8,535,082 | B2 | * | 9/2013 | Lifson | 439/369 |
| 8,616,222 | B2 | * | 12/2013 | Baker et al. | 132/200 |
| D707,553 | S | * | 6/2014 | Vantrease | D9/435 |
| 2003/0016885 | A1 | * | 1/2003 | Chow | A22C 13/0009 383/71 |
| 2003/0082278 | A1 | * | 5/2003 | Chow | A22C 13/0009 426/106 |
| 2005/0210639 | A1 | * | 9/2005 | Cuisinier | 24/455 |

* cited by examiner

*Primary Examiner* — Robert J Sandy
*Assistant Examiner* — Rowland Do
(74) *Attorney, Agent, or Firm* — Harpman & Harpman

(57) ABSTRACT

A disposable reusable bag closure element that provides for improved bag closing and ease of use. The closure in its preferred form a flat synthetic resin tab having a bifurcated hinge co-planar body member with a bag insertion guide in communication with a retainment sealing portion. The bag closure can be formed in multiple linearly attached aligned progressive elements allowing for selective removal and independent use.

1 Claim, 3 Drawing Sheets

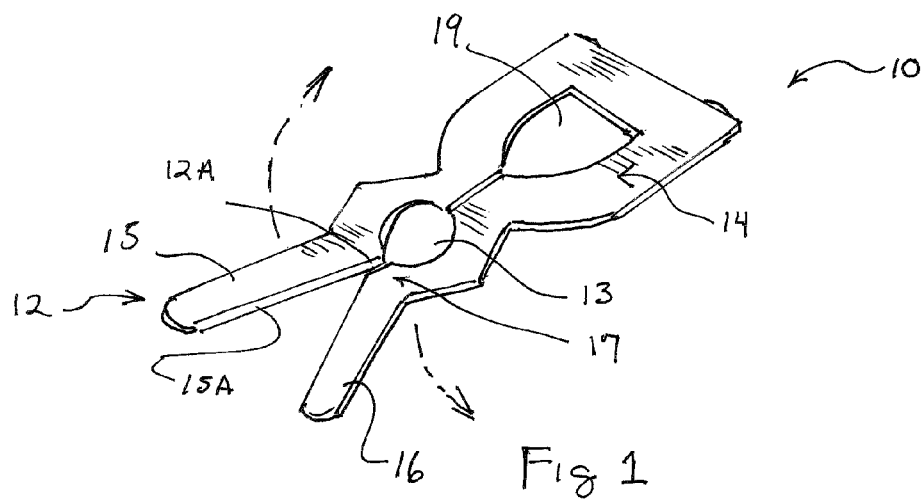
Fig 1
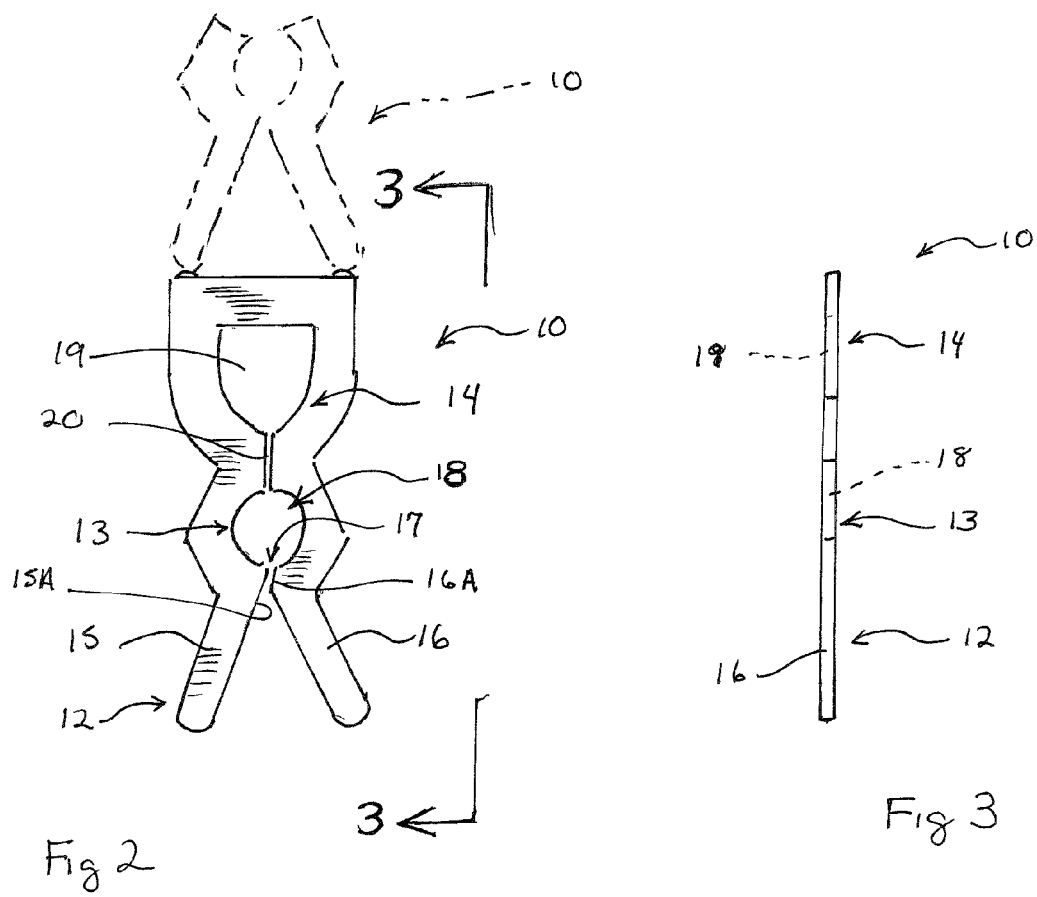
Fig 2
Fig 3

INTEGRATED BAG CLOSURE

This application claims the benefit of U.S. Provisional Application No. 61/895,666, filed Oct. 25, 2013.

BACKGROUND OF THE INVENTION

1. Technical Field

This invention relates to closure tags that are used to secure the open ends of flexible bags by gathering the material together and inserting into a retainment sealing clip inwardly of its open end.

2. Description of Prior Art

Prior art devices of this type have been developed to engage and hold the gathered end of a flexible container in a single area and are used extensively in the food industry for bread and other bagged goods. Such devices typically have a single flat planar design with an opening extending inwardly from one edge thereof into which the material is inserted, see for example U.S. Pat. Nos. 2,981,990, 4,509,231, 4,760,624, 4,896,366 and 8,113,481.

In U.S. Pat. No. 2,981,990 it is directed to a bag closure seal having a tab configuration with a pair of bag material insert openings therein.

U.S. Pat. No. 4,509,231 discloses a dual opening bag closure with oppositely disposed bag engagement openings.

U.S. Pat. No. 4,760,624 claims a closure holder having a zig zag access slip leading to a bag engagement opening with enhanced edge surface gripping configurations.

U.S. Pat. No. 4,896,366 is directed to a t-shirt bag closure having oppositely disposed bag insert openings with transverse interengagement areas therewithin.

U.S. Pat. No. 8,113,481 illustrates a device for carrying animal waste bags having a bag insert slot and retainment with a hook portion extending therefrom.

SUMMARY OF THE INVENTION

An improved closure for flexible synthetic resin storage product bags having a pair of tab legs that form a guide channel with a resilient opening there between. The tab legs are interconnected by a wide support base with a hinge split there between defining a material retainment portion. The closure of the invention provides for improved ease of bag engagement and retention as well as removal while affording a secure attachment closure to the container bag.

DESCRIPTION OF THE DRAWINGS

FIG. 1 is a perspective view of the closure tab of the invention.

FIG. 2 is a top plan view thereof.

FIG. 3 is a side elevational view on lines 3-3 of FIG. 2.

DETAILED DESCRIPTION OF THE INVENTION

Figure 4:
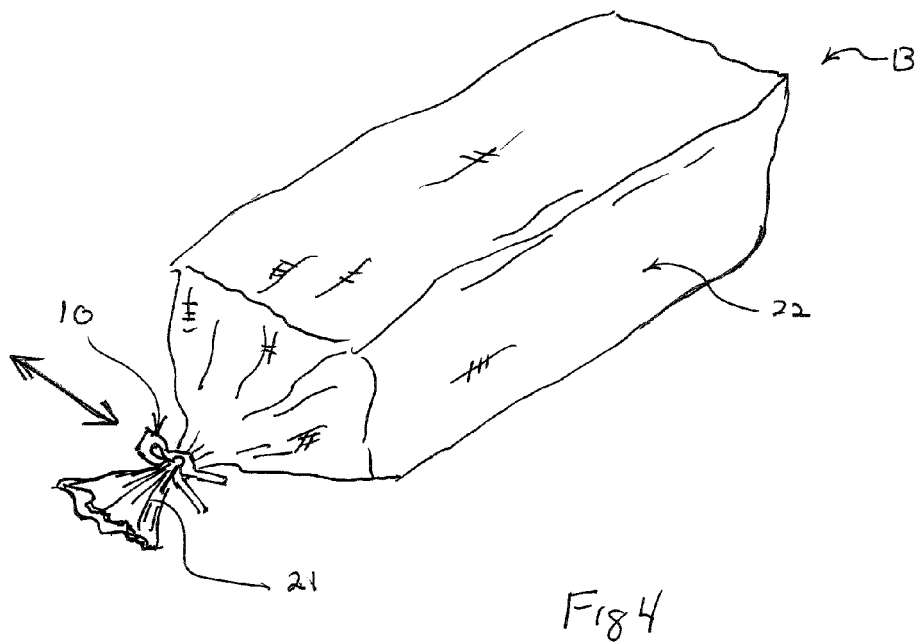
FIG. 4 is a perspective view graphically illustrating the closure tab of the invention secured onto a product bag.

Referring to FIGS. 1 and 2 of the drawings, a bag closure tab 10 of the invention can be seen having a contoured main body member 11 with a guide portion 12, a retainment portion 13 and a hinged base portion 14. The guide portion 12 is defined by bifurcated tab legs 15 and 16 in angularly opposed relation to one another. The tab legs 15 and 16 form a V-shaped guide channel there between terminating at an area of reduced dimension at 17. The retainment portion 13 is in communication with the guide portion 12 and is defined by a contoured open area 18 into which the gathered bag material is inserted affecting a seal and retained as seen in FIG. 4 of the drawings. An access opening 12A is formed between the respective tab legs 15 and 16 with the leg 16 having an angularly disposed edge portion 16A in oppositely disposed relation to the corresponding leg edge portion 15A. This defines a parallel passageway there between and assist in the retainment of the gathered bag closer portion 21 of a typical food retainment and storage bag 22, best seen in FIG. 4 of the drawings. The hinged base portion 14 has an open area there within at 19 with a slot 20 extending therefrom to the retainment portion 13. The open area 19 affords the deflection of the closure 10 longitudinally to aid in the engagement and removal from the bag B as illustrated in FIG. 4 of the drawings. The closure 10 is generally formed of a thin flat synthetic resin material which allows trans-lateral deflection for ease of removal after the tab has been engaged onto the bag.

Figure 5:
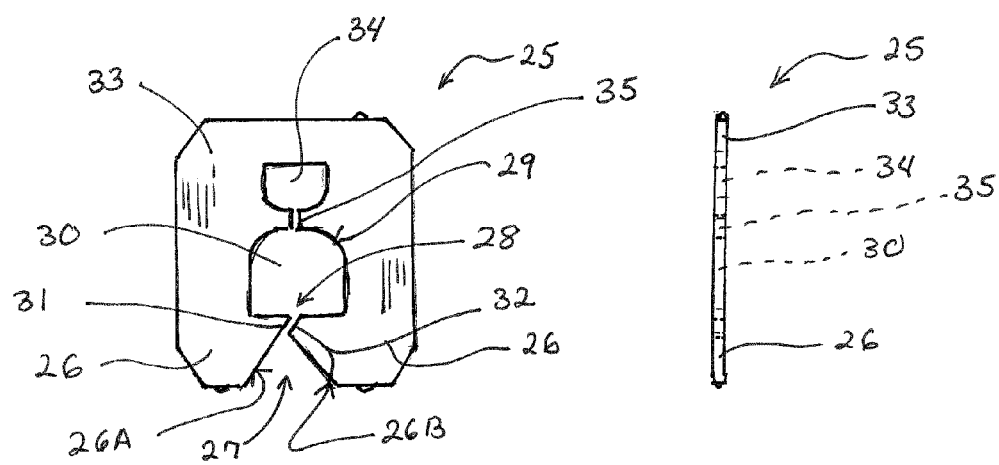
FIG. 5 is a front elevational view of an alternate form of the enclosure.
Figure 6:
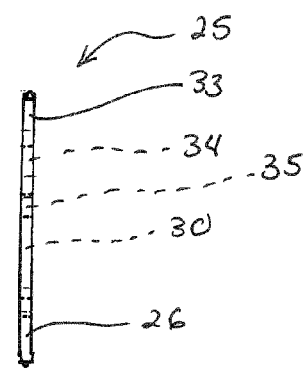
FIG. 6 is a side elevational view thereof.
Figure 7:
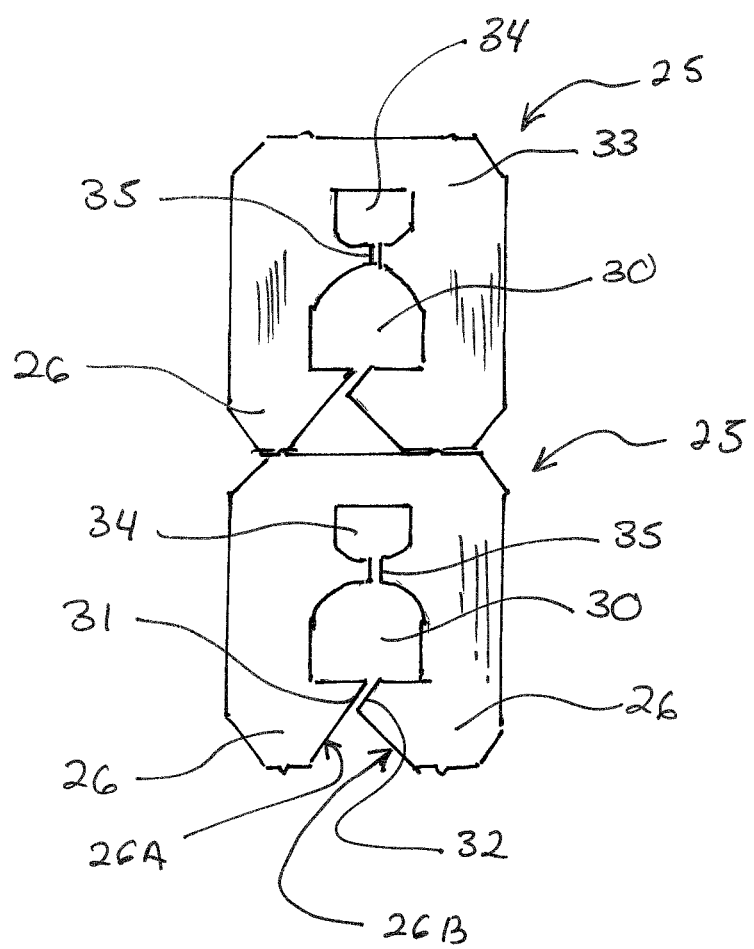
FIG. 7 is a front elevational view of multiple attachment closures before separation for use.

Referring to FIGS. 5, 6 and 7 of the drawings, an alternate form of the invention can be seen wherein a closure 25 has a pair of reduced dimensional tabs 26 having angularly opposing edges 26A and 26B forming a bag material V-shaped guide area 27 there between. An access opening 28 of reduced dimension is formed between the respective tab edges 26A and 26B in communication with a bag material insert retaining portion 29 defined by a contoured open area 30.

The access opening 28 has spaced parallel angular edge portions 31 and 32 to assist in the retainment of the gathered back closure portion 21, as seen in FIG. 4 of the drawings of a typical food retainment and storage bag 22.

A hinged base 33 has an open area there within at 34 with a slot 35 extending therefrom to the hereinbefore described insert retainment portion 29.

The alternate closure 25 is also generally formed of a thin, flat synthetic resin material as set forth in the primary form of the invention 10. This accordingly allows for translateral deflection between the respective tabs 26 for ease of removal after the closure 25 has been so engaged with a bag such as 22 as hereinbefore described.

It will be seen that by utilization of the closure tab 10 of the invention, an improved closure device has been illustrated and described and that various changes and modifications may be made thereto without departing from the spirit of the invention.

Therefore I claim:

1. A bag closure for closing the neck of a bag comprising,
a thin, flat body member having a pair of elongated angularly disposed tabs having respective first tab edges and a second continuous tab edge defining a V-shaped guide channel there between and an oppositely disposed hinged base portion, an angular offset tab edge of said first tab edges in parallel spaced relation to said second continuous tab edge defining a material access opening between said tabs,
said angular offset edge tab and said second continuous tab edge are of unequal length terminating at and in communication with an annular open area in said body member,
a contoured open area in said hinged base portion with a slot extending between said annular and contoured open areas,
said contoured open area in said hinged base portion having a greater dimension than that of said contoured open area in said body member and said thin flat body member has areas of reduced transverse dimensions adjacent said slot between said respective contoured open areas and adjacent said material access opening between said tabs.

* * * * *